(12) United States Patent
Chern et al.

(10) Patent No.: US 11,815,700 B2
(45) Date of Patent: Nov. 14, 2023

(54) OPTICAL LENS ASSEMBLY

(71) Applicant: EVERREADY PRECISION IND. CORP., Kaohsiung (TW)

(72) Inventors: Jyh-Long Chern, Zhubei (TW); Chih-Ming Yen, Taipei (TW)

(73) Assignee: EVERREADY PRECISION IND. CORP., Kaohsiung (TW)

( * ) Notice: Subject to any disclaimer, the term of this patent is extended or adjusted under 35 U.S.C. 154(b) by 99 days.

(21) Appl. No.: 16/993,962

(22) Filed: Aug. 14, 2020

(65) Prior Publication Data

US 2020/0371274 A1 Nov. 26, 2020

Related U.S. Application Data

(60) Division of application No. 16/555,180, filed on Aug. 29, 2019, now abandoned, which is a continuation-in-part of application No. 15/241,427, filed on Aug. 19, 2016, now Pat. No. 10,436,950.

(30) Foreign Application Priority Data

Sep. 25, 2015 (TW) .................................. 104215589

(51) Int. Cl.
- *G02B 3/00* (2006.01)
- *B29C 45/56* (2006.01)
- *B29C 45/14* (2006.01)
- *B29L 11/00* (2006.01)

(52) U.S. Cl.
CPC ...... *G02B 3/0031* (2013.01); *B29C 45/14336* (2013.01); *B29C 45/56* (2013.01); *G02B 3/0043* (2013.01); *B29L 2011/0016* (2013.01)

(58) Field of Classification Search
CPC ................ G02B 3/0031; G02B 3/0043; B29C 45/14336; B29C 45/56; B29L 2011/0016
USPC ......................................................... 359/720
See application file for complete search history.

(56) References Cited

U.S. PATENT DOCUMENTS

| | | | |
|---|---|---|---|
| 5,330,799 A * | 7/1994 | Sandor ............. | B29D 11/00288 118/212 |
| 5,437,926 A | 8/1995 | Takahashi et al. | |
| 6,489,607 B1 * | 12/2002 | Nakano ..................... | G01J 1/02 250/214.1 |

* cited by examiner

*Primary Examiner* — Wyatt A Stoffa
*Assistant Examiner* — Mitchell T Oestreich
(74) *Attorney, Agent, or Firm* — Muncy, Geissler, Olds & Lowe, P.C.

(57) ABSTRACT

An optical lens assembly is produced by an injection-compression molding process. The optical lens assembly includes a lens body and an injection-molded structure. The lens body includes a first lens surface and a second lens surface opposed to the first lens surface. The lens body is divided into an optically effective zone and an optically ineffective zone. The injection-molded structure has at least one gate land in response to the injection-compression molding process. At least a portion of the optically ineffective zone of the lens body is covered by the injection-molded structure, and the injection-molded structure is assembled with and positioned by an external structure. Each of the first lens surface and the second lens surface is one of a multi-aperture lens surface, a lenticular lens surface, an aspheric lens surface, a flat lens surface and a freeform lens surface.

15 Claims, 5 Drawing Sheets

OPTICAL LENS ASSEMBLY

CROSS-REFERENCE TO RELATED APPLICATION

This application is a divisional application of U.S. patent application Ser. No. 16/555,180, field Aug. 29, 2019, which is a Continuation-in-part of U.S. patent application Ser. No. 15/241,427, and hereby incorporates the content of this application by reference.

FIELD OF THE INVENTION

The present invention relates to an optical lens assembly, and more particularly to an optical lens assembly using an injection-molded structure to cover a lens body.

BACKGROUND OF THE INVENTION

With the advance of science and technology, the processes of fabricating many miniature objects are gradually developed. For example, the trends of designing optical lenses are toward smaller diameter and reduced thickness. That is, the optical lenses are developed toward miniaturization. Moreover, since the functions of electronic devices are gradually diversified in the electronic industries, optical lenses are integrated into mobile electronic devices or wearable electronic devices. These miniature optical lenses usually need to have multiple functions.

Generally, the essential components of a lens module comprise plural optical lenses and plural holders for supporting the optical lenses. Moreover, the optical lenses and the holders are connected with each other. For reducing the volume of the lens module, it is necessary to minimize the optical lenses while minimizing the holders. However, the miniaturization of the lens module results in many problems. For example, since the holder cannot be fabricated easily, the structural strength of the holder is impaired. Moreover, since the volumes of the components are decreased, it takes more time for the assembling workers to assemble the optical lenses with the holders. Under this circumstance, the assembling efficiency of the lens module is usually unsatisfied.

Moreover, for avoiding generation of the ghosting effect or the stray light, an additional light-shielding element is arranged between adjacent optical lenses. The light-shielding element is used for preventing the light beam from passing through the optically ineffective zone of the optical lens. The light-shielding element is also the reason that the overall assembling space of the lens module cannot be effectively reduced.

Therefore, there is a need of provided an optical lens assembly with high structural strength and reduced volume and capable of reducing the influence of the stray light in order to overcome the above drawbacks.

SUMMARY OF THE INVENTION

An object of the present invention provides an optical lens assembly with a lens body and an injection-molded structure. The injection-molded structure is produced by an injection-compression molding process, and thus the structural strength of the injection-molded structure is increased. Moreover, the injection-molded structure is combined with an optically ineffective zone of the lens body by the injection-compression molding process. Since the injection-molded structure can prevent the light beam from passing through the optically ineffective zone of the lens body, the generation of the ghosting effect or the stray light is effectively avoided.

In accordance with an aspect of the present invention, there is provided an optical lens assembly. The optical lens assembly includes a lens body and an injection-molded structure. The lens body includes a first lens surface and a second lens surface opposed to the first lens surface. The lens body is divided into an optically effective zone and an optically ineffective zone. The injection-molded structure is fabricated by a injection-compression process and has at least one gate land in response to the injection-compression molding process. At least a portion of the optically ineffective zone of the lens body is covered by the injection-molded structure, and the injection-molded structure is assembled with and positioned by an external structure. The first lens surface is one of a multi-aperture lens surface, a lenticular lens surface, an aspheric lens surface, a flat lens surface and a freeform lens surface. The second lens surface is one of a multi-aperture lens surface, a lenticular lens surface, an aspheric lens surface, a flat lens surface and a freeform lens surface.

In an embodiment, the injection-molded structure is further subjected to an ultraviolet-assisted curing process.

In an embodiment, the injection-molded structure has two gate lands in response to the injection-compression molding process, and the two gate lands are located at the same side of the injection-molded structure or the two gate lands are respectively located at two opposite sides of the injection-molded structure.

In an embodiment, the injection-molded structure is a rectangular structure with four gate lands in response to the injection-compression molding process. The four gate lands are respectively located at four lateral sides of the injection-molded structure. Alternatively, the injection-molded structure is a rectangular structure with six gate lands in response to the injection-compression molding process. Moreover, four of the six gate lands are located at two long sides of the injection-molded structure and two of the six gate lands are located at two short sides of the injection-molded structure.

In an embodiment, both of the first lens surface and the second lens surface of the lens body are the multi-aperture lens surfaces.

In an embodiment, the lens body has an optical axis, and the multi-aperture lens surfaces are asymmetric with respect to the optical axis.

In an embodiment, multiple orientations of the multi-aperture lens surface are asymmetric with respect to the lens body.

In an embodiment, aperture forms of the multi-aperture lens surface are selected from at two of different boresight viewing directions, orientations, clear apertures, edge thicknesses and appearances.

In an embodiment, microstructures of the multi-aperture lens surface are symmetrically distributed with respect to an orientation of the at least one gate land.

In an embodiment, the first lens surface is the multi-aperture lens surface, and the second lens surface is the lenticular lens surface.

In an embodiment, the lens body has an optical axis, and the multi-aperture lens surface and the lenticular lens surface are asymmetric with respect to the optical axis.

In an embodiment, multiple orientations of the lenticular lens surface are asymmetric with respect to the lens body.

In an embodiment, the lenticular lens surface includes plural micro lenticular lenses, and the plural micro lenticular lenses have different orientations, boresight viewing directions, pitches, depths and/or appearances.

In an embodiment, aperture forms of the multi-aperture lens surface are selected from at two of different orientations, clear apertures, edge thicknesses and appeared surface outlooks.

In an embodiment, microstructures of the multi-aperture lens surface and the lenticular lens surface are symmetrically distributed with respect to an orientation of the at least one gate land.

In an embodiment, a central thickness of the lens body is not smaller than one fifth of a corresponding diameter of a clear aperture of the lens body.

In an embodiment, both of the first lens surface and the second lens surface of the lens body are the aspheric lens surfaces, and the aspheric lens surfaces are asymmetric with respect to an optical axis of the lens body, or both of the first lens surface and the second lens surface of the lens body are the free form lens surfaces, and the free form lens surfaces are asymmetric with respect to an optical axis of the lens body.

In an embodiment, an edge thickness of the lens body is not smaller than one fifth of the corresponding diameter of a clear aperture of the lens body, or the edge thickness of the lens body is not smaller than one tenth of a corresponding thickness of the clear aperture of the lens body.

In an embodiment, microstructures of the first lens surface and the second lens surface are symmetrically distributed with respect to an orientation of the at least one gate land.

The above objects and advantages of the present invention will become more readily apparent to those ordinarily skilled in the art after reviewing the following detailed description and accompanying drawings, in which:

DETAILED DESCRIPTION OF THE PREFERRED EMBODIMENT

The present invention provides an optical lens assembly. Moreover, a lens module may be defined by plural optical lens assemblies collaboratively. The optical lens assembly is a miniature product with reduced volume. The length, width or diameter (D) of the actual product is smaller than 10 mm, the thickness (L) of the actual product is smaller than 4 mm. In an embodiment, the equivalent diameter-to-thickness ratio (D/L) is 10:4. Effectively, the diameter (D) of the actual product is matches to a sensor size of an optical device. The thickness (L) of the actual product is correlated to the total track length (TTL) of a lens module when the lens module is a combination of multiple lens assemblies. The volume and size of the actual product are presented herein for purpose of illustration and description only.

Figure 1:
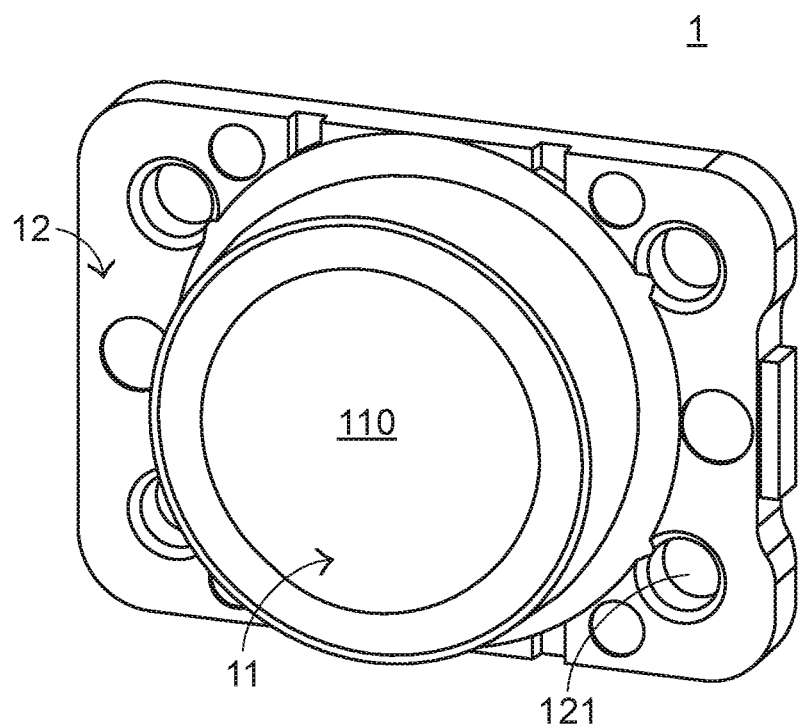
FIG. 1 is a schematic perspective view illustrating an optical lens assembly according to a first embodiment of the present invention.
Figure 2:
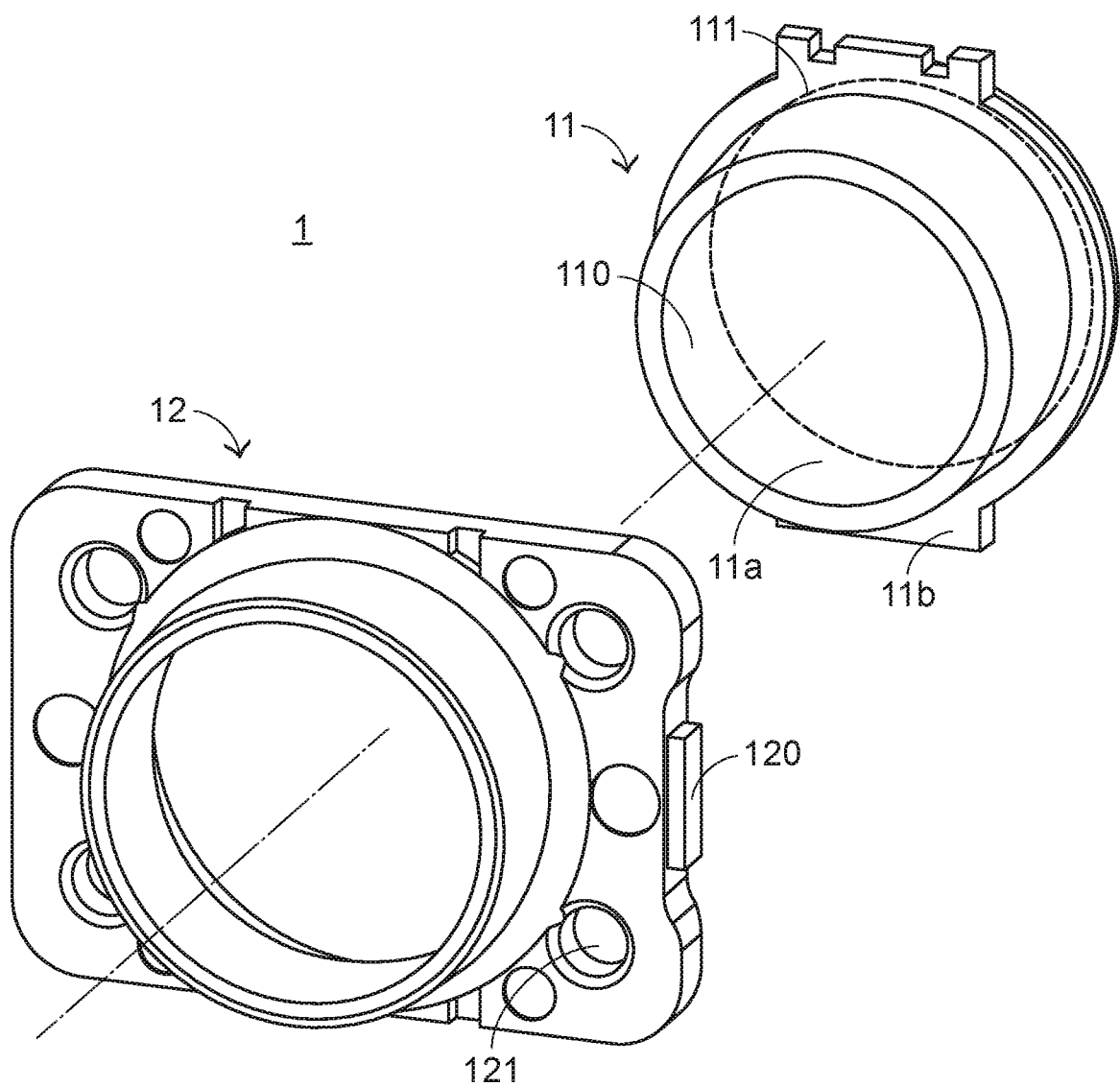
FIG. 2 is a schematic exploded view illustrating the optical lens assembly according to a first embodiment of the present invention.

FIG. 1 is a schematic perspective view illustrating an optical lens assembly according to a first embodiment of the present invention. FIG. 2 is a schematic exploded view illustrating the optical lens assembly according to a first embodiment of the present invention. As shown in FIGS. 1 and 2, the optical lens assembly 1 comprises a lens body 11 and an injection-molded structure 12.

Firstly, the structure of the lens body 11 will be described as follows. As shown in FIG. 2, the lens body 11 comprises an optically effective zone 11a and an optically ineffective zone 11b. The optically effective zone 11a is located at a center region of the lens body 11. The optically ineffective zone 11b is located at a peripheral region of the lens body 11. The optically effective zone 11a of the lens body 11 is the region of the lens body 11 that is designed for allowing the light beam to pass through. That is, the optically effective zone 11a has good refracting function or any other function of changing the optical path in order to achieve the sharp imaging efficacy. The optically ineffective zone 11b of the lens body 11 is the region of the lens body 11 that is designed for blocking the light beam. Since the stray light does not pass through the optically ineffective zone 11b, the imaging quality is enhanced.

Next, the injection-molded structure 12 will be described as follows. In this embodiment, the injection-molded structure 12 is produced by an injection-compression molding process. During the injection-compression molding process, at least a portion of the optically ineffective zone 11b of the lens body 11 is covered by the injection-molded structure 12. More preferably, the entire of the optically ineffective zone 11b of the lens body 11 is covered by the injection-molded structure 12 (see FIG. 1). The injection-molded structure 12 can block the stray light or prevent the light beam from passing through the optically ineffective zone 11b in order to achieve the enhanced imaging quality. Moreover, since the structural strength of the injection-molded structure 12 is high enough, the injection-molded structure 12 can be assembled with and positioned by an external structure. For example, the injection-molded structure 12 can be used as a component for fixing the lens body 11 during a process of assembling as lens module.

When the lens body 11 is covered by the injection-molded structure 12 in the injection-compression molding process, at least one fastening hole 121 is formed in the injection-molded structure 12. Through the fastening hole 121, the injection-molded structure 12 is engaged and connected with a middle frame of a mobile electronic device (not shown). As mentioned above, the injection-molded structure 12 is produced by the injection-compression molding process. Consequently, during the process of fabricating the optical lens assembly 1, the lens body 11 and the injection-molded structure 12 are combined together and the lens body 11 is fixed by the injection-molded structure 12. Since the assembling procedure to be performed by the assembling worker is largely simplified, the throughput of the optical lens assembly 1 is increased.

Moreover, a mold for performing the injection-compression molding process has a gate (not shown). After the injection-molded structure 12 is produced, a gate land 120 corresponding to the gate of the mold is formed on the injection-molded structure 12. According to the gate land 120 of the injection-molded structure 12, it is inferred that the injection-molded structure 12 is produced by the injection-compression molding process.

Figure 3:
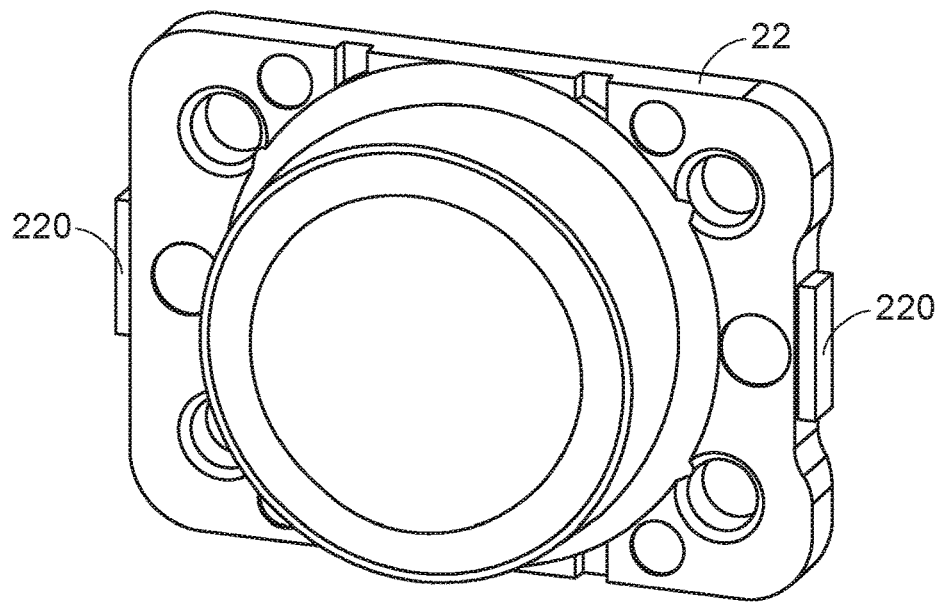
FIG. 3 is a schematic perspective view illustrating an optical lens assembly with two gate lands according to a second embodiment of the present invention.

In the above embodiment, the mold has a single gate. In another embodiment, the mold for performing the injection-compression molding process has a gate has two gates. FIG. 3 is a schematic perspective view illustrating an optical lens assembly with two gate lands according to a second embodiment of the present invention. Since the mold has two gates, the injection-molded structure 22 of the optical lens assembly 2 comprises two gate lands 220. In this embodiment, the two gate lands 220 are located at two opposite sides of the injection-molded structure 22. It is noted that numerous modifications and alterations may be made while retaining the teachings of the invention. For example, in another embodiment, the two gate lands 220 are located at the same side of the injection-molded structure 22.

Figure 4:
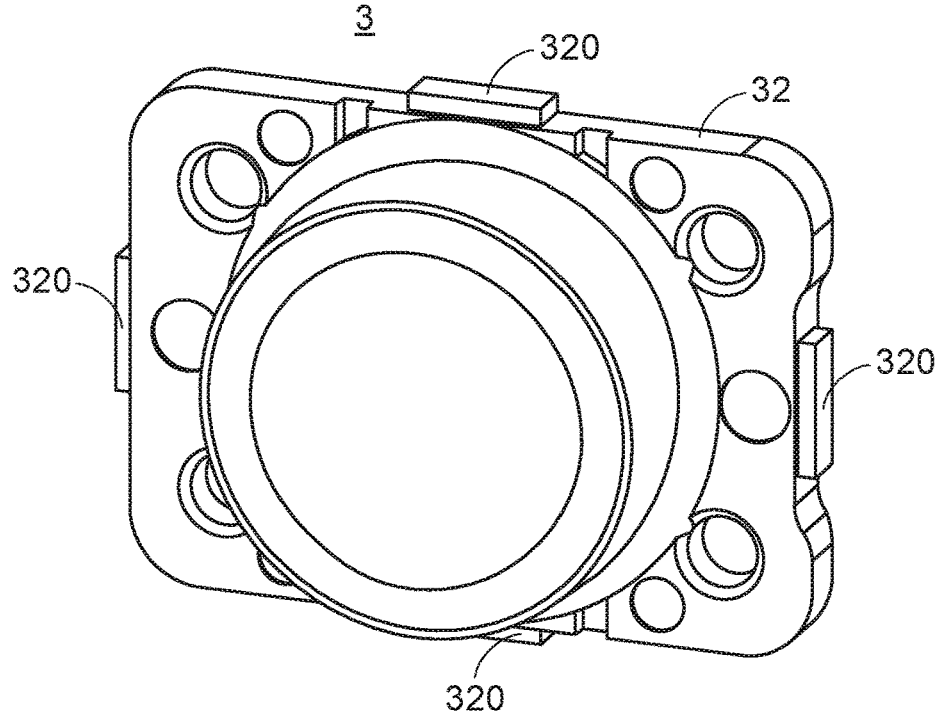
FIG. 4 is a schematic perspective view illustrating an optical lens assembly with four gate lands according to a third embodiment of the present invention.

FIG. 4 is a schematic perspective view illustrating an optical lens assembly with four gate lands according to a third embodiment of the present invention. Since the mold has four gates, the injection-molded structure 32 of the optical lens assembly 3 comprises four gate lands 320. The injection-molded structure 32 has a rectangular profile. The four gate lands 320 are respectively located at four lateral sides of the injection-molded structure 32.

Figure 5:
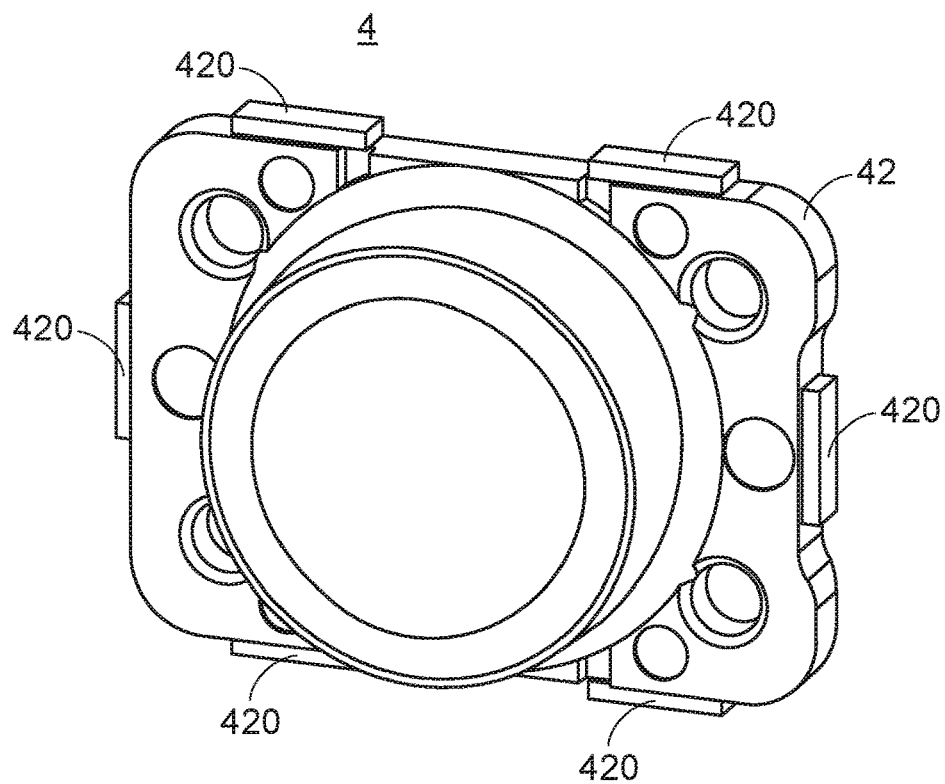
FIG. 5 is a schematic perspective view illustrating an optical lens assembly with sixth gate lands according to a fourth embodiment of the present invention.

FIG. 5 is a schematic perspective view illustrating an optical lens assembly with sixth gate lands according to a fourth embodiment of the present invention. Since the mold has six gates, the injection-molded structure 42 of the optical lens assembly 4 comprises six gate lands 420. The injection-molded structure 42 has a rectangular profile. Four of the six gate lands 420 are located at two long sides of the injection-molded structure 42, and two of the six gate lands 420 are located at two short sides of the injection-molded structure 42.

The use of the mold with plural gates to produce the injection-molded structure has many benefits. For example, since the melt is introduced into the mold in multiple directions, the flow rate of melt is more uniform. After the melt is solidified, the stress of the injection-molded structure can be well distributed. That is, since the stress is uniformly distributed, the overall structural strength is increased. It is noted that the number of the gate lands of the injection-molded structure is not restricted.

With the ultraviolet-assisted injection-compression molding process, the surface profile can be asymmetrical and even free form. Under the condition, the processing speed is faster. Moreover, by using the balance among the multiple gates, the process is more stable. Preferably but not exclusively, the injection-molded structure 12 is further subjected to an ultraviolet-assisted curing process. With adjustable ultraviolet curing, the strength at different portions of lens body 11 can be properly strengthened. Moreover, more than one gate of the mold is very critical to the process for a balance of compression injection to achieve different forms of surface profile and quality demands of the lens body 11.

Please refer to FIGS. 1 and 2 again. The lens body 11 of the optical lens assembly 1 has a first lens surface 110 and a second lens surface 111. Preferably, both of the first lens surface 110 and the second lens surface 111 are aspheric lens surfaces. In this embodiment, the central thickness of the lens body 11 is not smaller than one fifth of a corresponding diameter of a clear aperture of the lens body 11, and the edge thickness of the lens body 11 is not smaller than 20% (i.e., one fifth) of the corresponding diameter of the clear aperture of the lens body 11. By means of this design, the stability of the overall lens body is enhanced. In another embodiment, during formation of the lens body 11, the edge thickness of the lens body 11 is not smaller than 10% (i.e., one tenth) of the corresponding thickness of the clear aperture of the lens body 11. Similarly, the lens body in this thickness range has enhanced stability.

Figure 6:
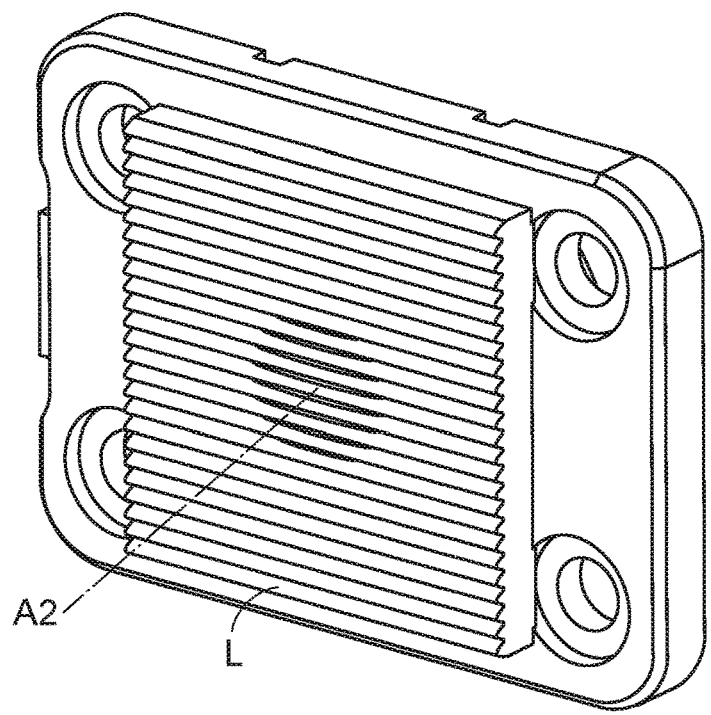
FIG. 6 is a schematic perspective view illustrating an optical lens assembly with a lenticular lens surface.
Figure 7:
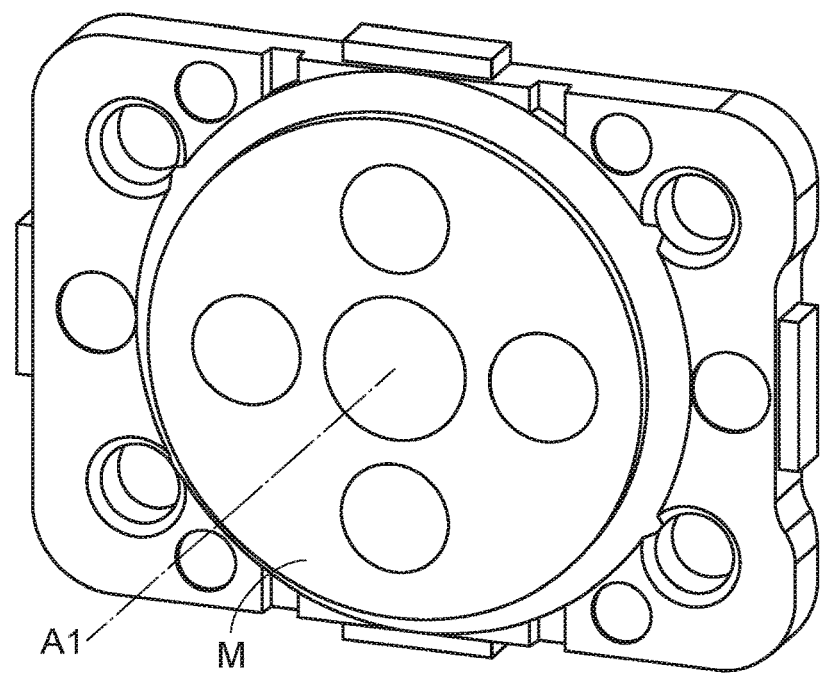
FIG. 7 is a schematic perspective view illustrating an optical lens assembly with a multi-aperture lens surface.

In the above embodiment, both of the first lens surface 110 and the second lens surface 111 are aspheric lens surfaces. In some other embodiments, the first lens surface 110 or the second lens surface 111 has another surface structure. As shown in FIG. 6, the lens body of the optical lens assembly has a lenticular lens surface L. As shown in FIG. 7, the optical lens assembly has a multi-aperture lens surface M. Alternatively, the optical lens assembly has any other appropriate lens surface such as a flat surface (not shown).

In some other embodiments, the surface structures of the first lens surface 110 and the second lens surface 111 are different. For example, the first lens surface 110 is an aspheric lens surface, and the second lens surface 111 is a lenticular lens surface L. Alternatively, the first lens surface 110 is a multi-aperture lens surface M, and the second lens surface 111 is a lenticular lens surface L.

Figure 8:
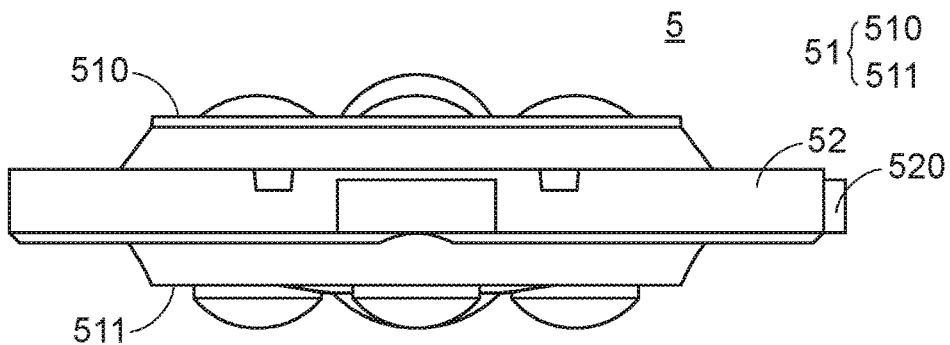
FIG. 8 is a schematic side view illustrating an optical lens assembly according to a fifth embodiment of the present invention.

FIG. 8 is a schematic side view illustrating an optical lens assembly according to a fifth embodiment of the present invention. In this embodiment, both of the first lens surface 510 and the second lens surface 511 of the optical lens assembly 5 are multi-aperture lens surfaces M. For observing both of the first lens surface 510 and the second lens surface 511, the side view of the optical lens assembly 5 is shown in FIG. 8. In this embodiment, multi-aperture lens surface M is symmetric with respect to an optical axis A1 (see FIG. 7) of the lens body 51. In another embodiment, the multi-aperture lens surface is asymmetric with respect to an optical axis A1. For example, multiple viewing directions (i.e., the boresight viewing directions) or orientations of the multi-aperture lens surface are asymmetric with respect to the lens body 51. That is, the multiple viewing directions of the multi-aperture lens surface are asymmetric with respect to the optical axis.

In a preferred embodiment, the aperture forms of the multi-aperture lens surface M are selected from at two of different orientations, clear apertures, edge thicknesses and appearances.

Moreover, since the injection-molded structure 52 is produced by the injection-compression molding process, the microstructures of the multi-aperture lens surface M are symmetrically distributed with respect to an orientation of at least one gate land 520 according to a physical rule.

Figure 9:
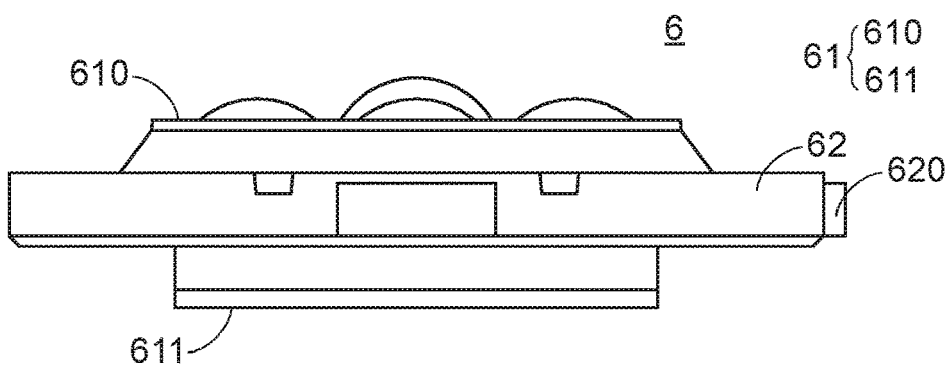
FIG. 9 is a schematic side view illustrating an optical lens assembly according to a sixth embodiment of the present invention.

FIG. 9 is a schematic side view illustrating an optical lens assembly according to a sixth embodiment of the present invention. In the optical lens assembly 6 of this embodiment, the first lens surface 610 is a multi-aperture lens surface M and the second lens surface 611 is a lenticular lens surface L. Moreover, the lens body 61 has an optical axis. The multi-aperture lens surface M is symmetric with respect to an optical axis A1 (see FIG. 7) of the lens body 61. Alternatively, the multi-aperture lens surface M is asymmetric with respect to an optical axis. Similarly, the lenticular lens surface L is symmetric with respect to an optical axis A2

(see FIG. 6) of the lens body 61. Alternatively, the lenticular lens surface L is asymmetric with respect to an optical axis.

Moreover, the lenticular lens surface L comprises plural micro lenticular lenses. The plural micro lenticular lenses have different orientations, boresight viewing directions, pitches, depths and/or appearances. According to the practical requirements, the configurations and locations of the micro lenticular lenses are adjusted by the manufacturer.

From the above descriptions, the present invention provides an optical lens assembly with a lens body and an injection-molded structure. While the injection-molded structure is produced by an injection-compression molding process, at least a portion of the lens body is covered by the injection-molded structure directly. Consequently, the space utilization is enhanced. Moreover, the light beam is blocked by the optically ineffective zone of the lens body, and thus the generation of the stray light is effectively avoided. Moreover, the assembling procedure is simplified. Moreover, as the number of the gates of the mold is increased, the structural strength of the optical lens assembly is enhanced and the use life of the overall product is largely increased.

While the invention has been described in terms of what is presently considered to be the most practical and preferred embodiments, it is to be understood that the invention needs not be limited to the disclosed embodiments. On the contrary, it is intended to cover various modifications and similar arrangements included within the spirit and scope of the appended claims which are to be accorded with the broadest interpretation so as to encompass all such modifications and similar structures.

What is claimed is:

1. A method for producing an optical lens assembly, comprising:
    providing a lens body comprising a first lens surface and a second lens surface opposed to the first lens surface, wherein the lens body includes an optically effective zone and an optically ineffective zone; and
    performing an ultraviolet-assisted injection-compression process including an injection-compression process and an ultraviolet-assisted curing process on the lens body to form an injection-molded structure having one gate land or more gate lands, wherein at least a portion of the optically ineffective zone of the lens body is covered by the injection-molded structure, and the injection-molded structure is assembled with and positioned by an external structure,
    wherein the first lens surface is a multi-aperture lens surface, and the second lens surface is a lenticular lens surface, or wherein both of the first lens surface and the second lens surface of the lens body are aspheric lens surfaces, or wherein both of the first lens surface and the second lens surface of the lens body are free form lens surfaces,
    wherein the lens body has an optical axis, and the multi-aperture lens surface is asymmetric with respect to the optical axis, or wherein the lenticular lens surface is asymmetric with respect to the optical axis, or wherein the aspheric lens surfaces are asymmetric with respect to the optical axis, or wherein the free form lens surfaces are asymmetric with respect to the optical axis.

2. The method according to claim 1, wherein the injection-molded structure having two gate lands is formed by the ultraviolet-assisted injection-compression molding process, and the two gate lands are located at the same side of the injection-molded structure or the two gate lands are respectively located at two opposite sides of the injection-molded structure.

3. The method according to claim 1, wherein the injection-molded structure having four gate lands is formed by the ultraviolet-assisted injection-compression molding process, and the four gate lands are respectively located at four lateral sides of the injection-molded structure; or the injection-molded structure having six gate lands is formed by the ultraviolet-assisted injection-compression molding process, and four of the six gate lands are located at two long sides of the injection-molded structure and two of the six gate lands are located at two short sides of the injection-molded structure.

4. The method according to claim 1, wherein both of the first lens surface and the second lens surface of the lens body are the multi-aperture lens surfaces.

5. The method according to claim 4, wherein the multi-aperture lens surfaces are asymmetric with respect to the optical axis.

6. The method according to claim 4, wherein multiple orientations of the multi-aperture lens surface are asymmetric with respect to the lens body.

7. The method according to claim 4, wherein aperture forms of the multi-aperture lens surface are selected from at least two of different boresight viewing directions, orientations, clear apertures, edge thicknesses and appearances.

8. The method according to claim 4, wherein microstructures of the multi-aperture lens surface are symmetrically distributed with respect to an orientation of the at least one gate land.

9. The method according to claim 1, wherein multiple orientations of the lenticular lens surface are asymmetric with respect to the lens body.

10. The method according to claim 1, wherein the lenticular lens surface comprises plural lenticular lenses, and the plural lenticular lenses have different orientations, boresight viewing directions, pitches, depths and/or appearances.

11. The method according to claim 1, wherein aperture forms of the multi-aperture lens surface are selected from at least two of different orientations, clear apertures, edge thicknesses and appeared surface outlooks.

12. The method according to claim 1, wherein microstructures of the multi-aperture lens surface and the lenticular lens surface are symmetrically distributed with respect to an orientation of the at least one gate land.

13. The method according to claim 1, wherein a central thickness of the lens body is not smaller than one fifth of a corresponding diameter of a clear aperture of the lens body.

14. The method according to claim 1, wherein an edge thickness of the lens body is not smaller than one fifth of the corresponding diameter of a clear aperture of the lens body, or the edge thickness of the lens body is not smaller than one tenth of a corresponding thickness of the clear aperture of the lens body.

15. The method according to claim 14, wherein microstructures of the first lens surface and the second lens surface are symmetrically distributed with respect to an orientation of the at least one gate land.

* * * * *